(12) United States Patent
Crici

(10) Patent No.: US 8,684,807 B1
(45) Date of Patent: Apr. 1, 2014

(54) SYSTEM, METHOD AND COMPUTER PROGRAM PRODUCT FOR PROVIDING AN INTERACTIVE TRIVIA GAME ON AN ELECTRONIC DEVICE

(76) Inventor: Richard Crici, St. Johns, FL (US)

( * ) Notice: Subject to any disclaimer, the term of this patent is extended or adjusted under 35 U.S.C. 154(b) by 0 days.

(21) Appl. No.: 13/367,281

(22) Filed: Feb. 6, 2012

Related U.S. Application Data

(60) Provisional application No. 61/439,625, filed on Feb. 4, 2011.

(51) Int. Cl.
*A63F 9/24* (2006.01)
*A63F 13/00* (2006.01)

(52) U.S. Cl.
USPC .............................. 463/9; 434/322; 434/350

(58) Field of Classification Search
USPC ........... 463/1, 9, 29–31, 40–42; 434/322, 350
See application file for complete search history.

(56) References Cited

U.S. PATENT DOCUMENTS

| | | | |
|---|---|---|---|
| 6,377,781 B1 * | 4/2002 | Mishkin ........................ | 434/350 |
| 6,681,098 B2 * | 1/2004 | Pfenninger et al. ........... | 434/362 |
| 6,898,411 B2 * | 5/2005 | Ziv-el et al. ................... | 434/350 |
| 8,234,195 B1 * | 7/2012 | Berhanu et al. ................ | 705/35 |
| 2002/0042293 A1 * | 4/2002 | Ubale et al. ...................... | 463/9 |
| 2002/0049634 A1 * | 4/2002 | Longinotti ....................... | 705/14 |
| 2007/0077975 A1 * | 4/2007 | Warda .............................. | 463/9 |
| 2008/0146340 A1 * | 6/2008 | Ami ................................ | 463/42 |
| 2008/0242423 A1 * | 10/2008 | Kerr et al. ....................... | 463/42 |
| 2009/0005141 A1 * | 1/2009 | Lehtiniemi et al. ............. | 463/9 |
| 2009/0091087 A1 * | 4/2009 | Wasmund ...................... | 273/430 |
| 2011/0165924 A1 * | 7/2011 | Gorder et al. .................... | 463/9 |
| 2011/0256933 A1 * | 10/2011 | Place .............................. | 463/42 |

\* cited by examiner

*Primary Examiner* — Milap Shah

(57) ABSTRACT

An interactive web and mobile phone game system may include a web server having a database, a computer software program and a portable electronic device for interactively communicating with each other via a communications link when playing the game. The game may be played via computer such as a mobile phone, computer terminal or the like. As a non-limiting example, a portable electronic device may be utilized in a vehicle having an actuator linked to a transceiver via a communication interface. A plurality of vehicle components may further be linked to the actuator. In this way, the game may be played using the portable electronic device for remotely communicating with the web server and vehicle components via the communications link.

2 Claims, 5 Drawing Sheets

SYSTEM, METHOD AND COMPUTER PROGRAM PRODUCT FOR PROVIDING AN INTERACTIVE TRIVIA GAME ON AN ELECTRONIC DEVICE

CROSS REFERENCE TO RELATED APPLICATIONS

This application claims the benefit of U.S. Provisional Application No. 61/439,625, filed Feb. 4, 2011, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE PRESENT DISCLOSURE

1. Technical Field

This present disclosure relates to computer games and, more particularly, to a system, method and computer program product facilitating an interactive trivia game that enables a plurality of users to simultaneously play the trivia game from remote locations.

2. Prior Art

In addition, various trivia type games exist currently. Generally, players are asked questions by other players or teams from questions they purchase with the game; i.e., cards and playing pieces are moved on a board until a goal is attained. One drawback to traditional trivia games is that games tend to be topic specific and/or skill/age related. It would be advantageous to provide for the ability of multiple participants of any age or skill level the chance to compete fairly with all participants. This new method would be dynamic in nature and change from game to game depending on age and skill level of the participants. Also, it would be advantageous to give a player or players the ability to customize their gaming experience or that of their competitors or those for whom they are creating the game, test, or quiz.

In addition, with the integration of portable electronic devices, the internet, high speed computing and mobile technology, the ability to work and play computer games while on the move has changed the way people live. Numerous consumers use computer networks for many purposes including: to purchase products online, locate special events, read news stories, pay bills and play games. Online gaming is also provided over computer networks, such as the World Wide Web. Gaming web sites provide players with numerous types of computer games. In the online environment, trivia web sites that focus on trivia facts are popular in terms of use. Some of these web sites have subjects about celebrities, history, sports or movies. In these sites and others, a devotee of the subject might be invited to take a quiz about that subject. While these sites might test the devotee's knowledge, the quizzes do not provide the experience of playing against another player or group of players about the questions. Moreover, the sites with such quizzes, do not provide interactive gaming against various types of players based on age, skill set or level of knowledge for example.

U.S. Publication 2008/0,161,111 discloses that interactive games, such as role playing games are played on a cellular phone. The games are played by transmitting portions of the game to the player and obtaining a response from the player. The game portions are typically transmitted from an internet server to a player's cellular phone. Portions of the game may be transmitted as text messages.

In spite of the above, there is no known interactive trivia game available for users that may interact with vehicle components in a fun or safety focused way. For example, a lone driver or a family travelling together may want to play a game involving the driver to keep him awake while driving long distances or to keep the driver or vehicle occupants entertained in a trivia game instead of just listening to music or watching a movie.

Accordingly, a need remains for a system in order to overcome the above-noted shortcomings. The present disclosure satisfies such a need by providing an interactive web and mobile app based game system that is convenient and easy to use, lightweight yet durable in design, versatile in its applications, and designed for playing an interactive trivia game such as: a testing source for students, study guides, training material review or testing of employees in one or a multiple of remote locations.

BRIEF SUMMARY OF THE DISCLOSURE

In view of the foregoing background, it is therefore an object of the non-limiting exemplary embodiment(s) to provide an interactive trivia game that enables a plurality of users to simultaneously play the trivia game from remote locations. These and other objects, features, and advantages of the non-limiting exemplary embodiment(s) are provided by a system, method and computer program product for facilitating an interactive trivia game executing on at least one processor of a computing device. Functionality of the interactive trivia game preferably includes detecting a user input on a GUI screen of an application executing on the computing device; displaying a trivia game play object on the GUI; designating a type of first user detected at the GUI; selecting trivia game play default rules; and automatically creating trivia game questions from default settings.

In an embodiment, game play data may be sent and received via at least one of a hardware keyboard, software keyboard and a voice command interface.

In an embodiment, if the first user is a game owner, a second user may be invited to play the game. Then, it is determined whether the second user can forward a hyperlink of the game to a third user during game play.

In an embodiment, if the game play default rules consider credentials of the second user, questions may be selected based on the credentials.

In an embodiment, a first one of the game questions may be displayed to each of the first and second users; and each of the first and second users may be instructed to answer the first question.

In an embodiment, the computing device is one of: a game console, a laptop; a portable media player; a tablet computer; a PDA; a mobile computer; a stationary computer, and a mobile telephone. The computing device may be positioned either internal or external of a vehicle.

In an embodiment, game play is executed, within a vehicle, via a dedicated communications link. The game play data includes at least one alarm signal generated within the vehicle via the dedicated communications link for facilitating user interaction with the GUI.

There has thus been outlined, rather broadly, the more important features of exemplary embodiment(s) of the present disclosure in order that the detailed description thereof that follows may be better understood, and in order that the present contribution to the art may be better appreciated. There are additional features of the exemplary embodiment(s) of the present disclosure that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the exemplary embodiment(s) of the present disclosure, which is measured by the claims, nor is it intended to be limiting as to the scope of the exemplary embodiment(s) of the present disclosure in any way.

BRIEF DESCRIPTION OF THE SEVERAL VIEWS OF THE DRAWING

The novel features believed to be characteristic of exemplary embodiment(s) of the present disclosure are set forth with particularity in the appended claims. The exemplary embodiment(s) of the present disclosure itself, however, both as to its organization and method of operation, together with further objects and advantages thereof, may best be understood by reference to the following description taken in connection with the accompanying drawings in which:

Figure 1:
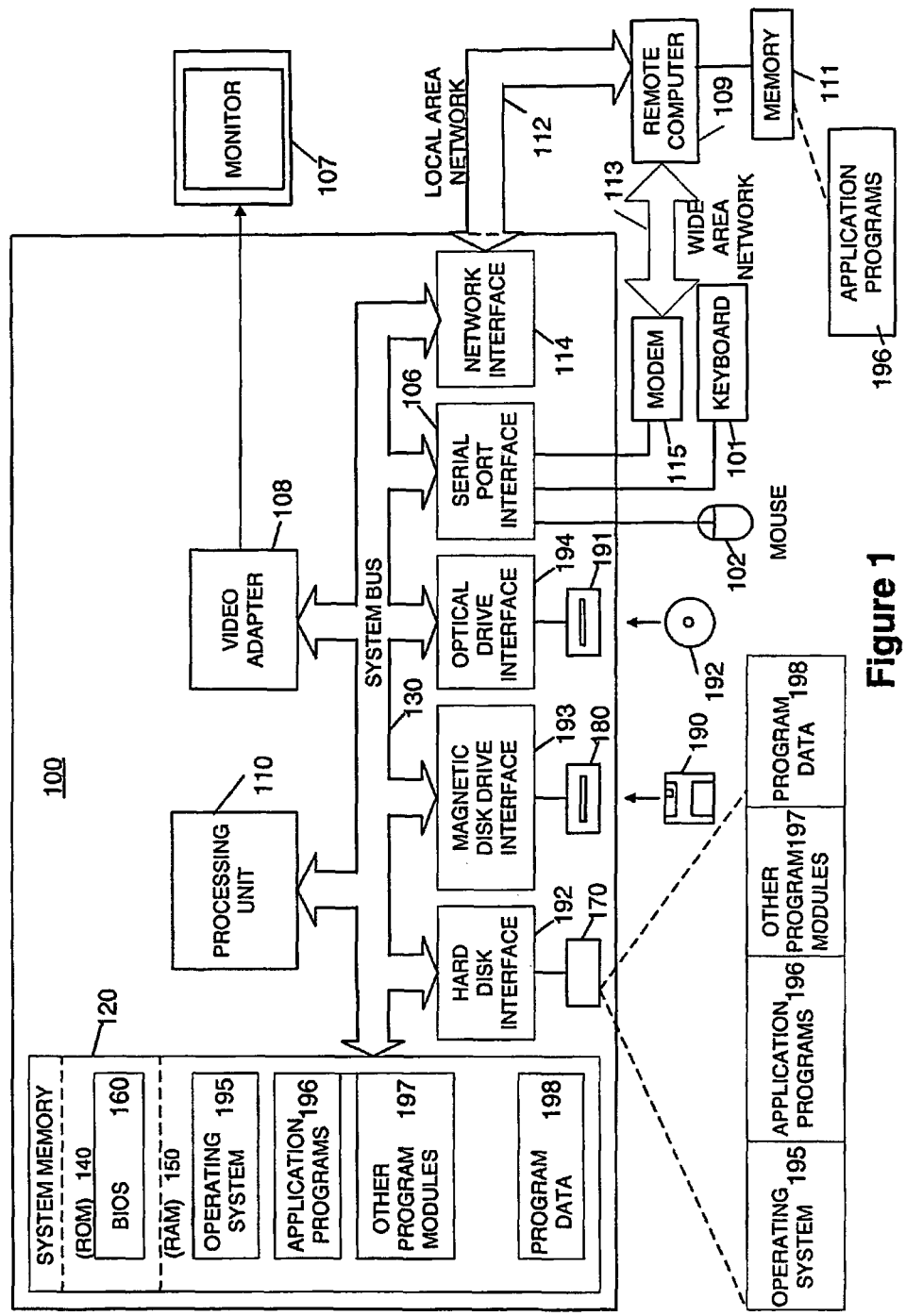
FIG. 1 is a block diagram showing an exemplary computing device performing the functions of the present disclosure, in accordance with the non-limiting exemplary embodiment(s)

Those skilled in the art will appreciate that the figures are not intended to be drawn to any particular scale; nor are the figures intended to illustrate every exemplary embodiment(s) of the present disclosure. The exemplary embodiment(s) of the present disclosure are not limited to any particular embodiment(s) depicted in the figures or the shapes, relative sizes or proportions shown in the figures.

DETAILED DESCRIPTION OF THE NON-LIMITING EXEMPLARY EMBODIMENT(S)

The non-limiting exemplary embodiment(s) will now be described more fully hereinafter with reference to the accompanying drawings, in which a preferred embodiment(s) of the non-limiting exemplary embodiment(s) is shown. Such non-limiting exemplary embodiment(s) may, however, be embodied in many different forms and should not be construed as limited to the embodiment(s) set forth herein. Rather, this embodiment(s) is provided so that this application will be thorough and complete, and will fully convey the true scope of the non-limiting exemplary embodiment(s) to those skilled in the art. Like numbers refer to like elements throughout the figures.

The illustrations of the embodiment(s) described herein are intended to provide a general understanding of the structure of the disclosure. The illustrations are not intended to serve as a complete description of all of the elements and features of apparatus and systems that utilize the structures or methods described herein. Many other embodiment(s) may be apparent to those of skill in the art upon reviewing the disclosure. Other embodiment(s) may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of various embodiment(s). Combinations of the above embodiment(s), and other embodiment(s) not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment(s) for the purpose of streamlining the disclosure. This disclosure is not to be interpreted as reflecting an intention that the claimed embodiment(s) require more features than are expressly recited in each claim. Rather, as the following claims reflect, inventive subject matter may be directed to less than all of the features of any of the disclosed embodiment(s). Thus, the following claims are incorporated into the Detailed Description, with each claim standing on its own as defining separately claimed subject matter.

The below disclosed subject matter is to be considered illustrative, and not restrictive, and the appended claims are intended to cover all such modifications, enhancements, and other embodiment(s) which fall within the true scope of the non-limiting exemplary embodiment(s). Thus, to the maximum extent allowed by law, the scope of the non-limiting exemplary embodiment(s) is to be determined by the broadest permissible interpretation of the following claims and their equivalents, and shall not be restricted or limited by the foregoing

DETAILED DESCRIPTION

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

The system of this disclosure is referred to generally in FIGS. 1-5 and is intended to provide an interactive web and/or mobile application game system for enabling a plurality of players to answer trivia questions and compare scores, for example. It should be understood that the present disclosure may be used to play an interactive trivia game such as a testing source for students, study guides, training material review and/or testing of employees from remote locations, as non-limiting examples.

Referring initially to FIG. 1, a schematic diagram of an exemplary conventional general-purpose digital computing environment that can be used to implement various aspects of the present disclosure is shown. In FIG. 1, a computer 100 may be understood to be a PC or a mobile telephony device, PDA, Smart Phone, etc. For example, computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 may include read only memory (ROM) 140 and random access memory (RAM) 150. A basic input/output system 160 (BIOS), containing the basic routines that help to transfer information between elements within the computer 100, such as during start-up, is stored in the ROM 140.

As an option, the computer 100 may include one or more of the following: a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 may be connected to the system bus 130 by a hard disk drive interface 192, a magnetic disk drive interface 193, and an optical disk drive interface 194, respectively. The drives and their associated computer-readable media may provide nonvolatile storage of computer readable instructions, data structures, program modules and other data for the computer 100. It will be appreciated by those skilled in the art that other types of computer readable media that can store data that is accessible by a computer/mobile cell-phone, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102, such as a mouse or stylus. Other input devices (not shown) may include a microphone, joystick, trackball, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, computers typically include other peripheral output devices (not shown), such as speakers and printers.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 may include a local area network (LAN) 112 and a wide area network (WAN) 113, cellular communications network. Such networking environments are commonplace in offices, enterprise-wide computer networks, intranets and the Internet.

When used in a LAN networking environment, the computer 100 may be connected to the local network 112 through a network interface or adapter 114. When used in a WAN networking environment, the computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the computer 100, or portions thereof, may be stored in the remote memory storage device.

It will be appreciated that the network connections shown are exemplary and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Although the FIG. 1 environment shows an exemplary conventional general-purpose digital environment, it will be understood that other computing environments may also be used. For example, one or more embodiments of the present disclosure may use an environment having fewer than all of the various aspects shown in FIG. 1 and described above, and these aspects may appear in various combinations and sub combinations that will be apparent to one of ordinary skill. For example, a mobile smart phone that communicates via a cellular network may employ alternate components that interface with such a communication protocol.

In a non-limiting exemplary embodiment, the interactive web and mobile app based game system 10 may include a web server 20 having a database 21, a software program 22 and a portable electronic device 23 (such as computer 100) for interactively communicating with each other via the internet or other conventional communications link 24 when playing the game. The game may further be played using a client terminal 25 (which may be another form of computer 100). Of course, the web server 20 may be simultaneously utilized by multiple portable electronic devices 23 and client terminals 25 (i.e., computer 100) at the same time by a plurality of users.

The web server 20 may interface with a call center that has a series of programmed voice recordings responsive to user inputs. Optionally, users may interact with a live person at the call center. The trivia game may also be downloaded and played in an off line mode, i.e. airplane mode. Customizable trivia games may be created by each user and administered to other users. The web server 20 may host a website with specific questions that are available for users to select to create their own game.

In addition, automatic scoring and prizes related to such scores may be provided via a computer software application hosted by the web server 20. For example, coupons may be sent based on preselected preferences or based on whereabouts of the user or other identifiers. The trivia game may be played in real time via plurality of users that may customize the game. The trivia game content may be customized by the users or an administrator assigning the game to the user. For example, the administrator may assign only geography questions for user who are 10 year olds. An audible interface may also be linked to the software program for verbally communicating questions/answers to the users.

Of course, the graphical user interface of the trivia game may be displayed on a computer screen or TV monitor from the mobile device or router, i.e. x-box or Play Station gaming systems, in a manner well known in the art.

Figure 3:
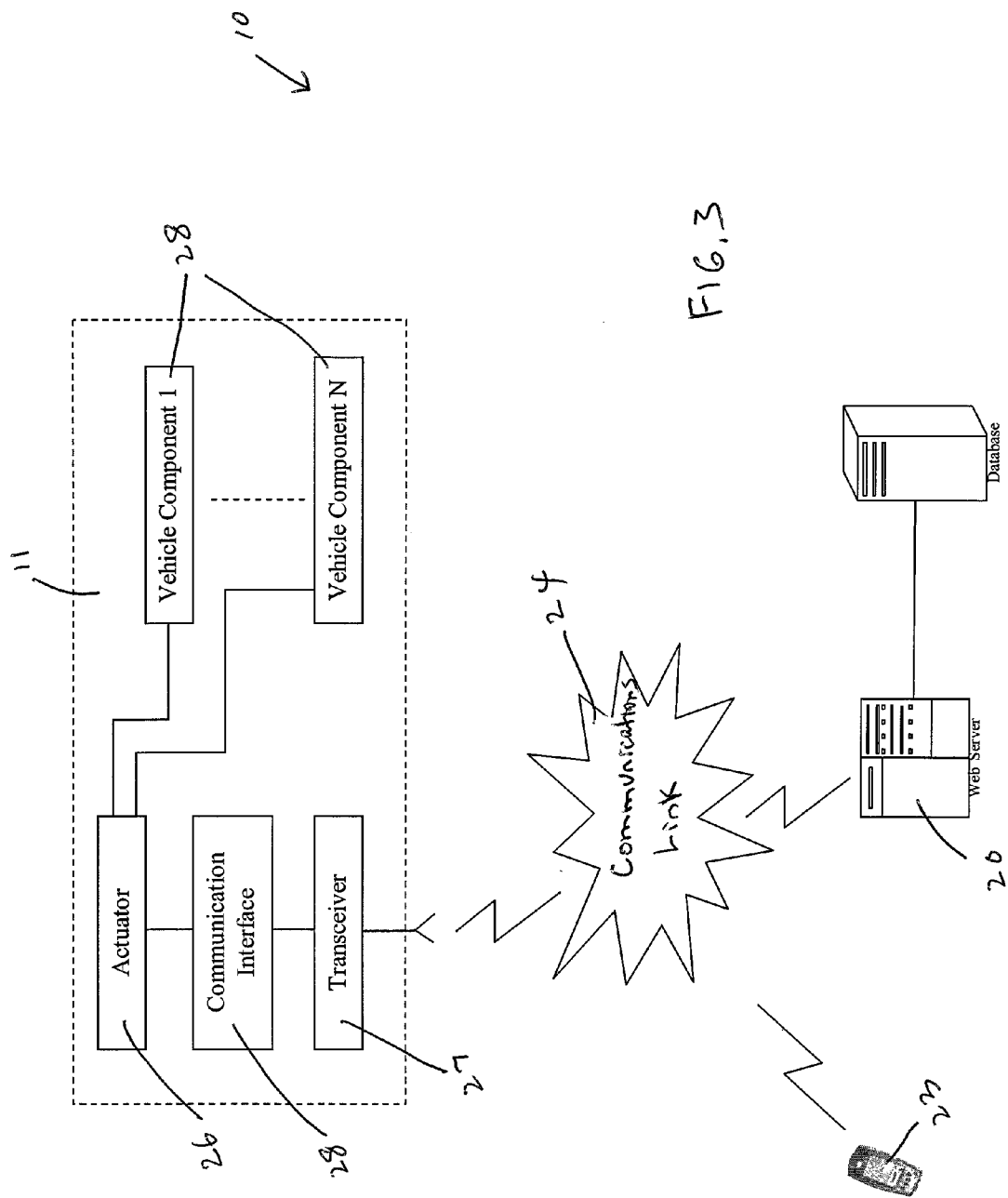
FIG. 3 is a block diagram showing the interrelationship between certain major electronic components, in accordance with the non-limiting exemplary embodiment(s)

As a non-limiting example, referring to FIG. 3, the portable electronic device 23 may be utilized in a vehicle 11 having an actuator 26 linked to a transceiver 27 via a communication interface 28. A plurality of vehicle components 28 may further be linked to the actuator 26. In this way, the game may be played using the portable electronic device 23 for remotely communicating with the web server 20 and vehicle components 28 via the internet 23. For example, if a user does not answer a question within a predetermined time period, the web server 20 may trigger the actuator 26 and thereby cause a component of the vehicle to emit an alert signal, such as vibrating the steering wheel, turning up the radio, flashing the vehicle lights, honking the horn, etc.

An application server, which may be communicatively coupled to the database server, hosts information, documents, scripts and software needed to provide user interfaces and enable performance of methodologies in accordance with an exemplary embodiment of the disclosure. By way of example and not limitation, the web application server may include web page information, documents and scripts (e.g., HTML and XML code), applets and application software, which enable users to submit requests and display data in response to such requests from users.

A plurality of users (e.g., individuals, companies, etc.) may access the web application server using compatible computing devices with network connectivity. By way of example, such devices may include personal computers, laptop computers, handheld computers a/k/a personal digital assistants, kiosks, mobile phones or any compatibly equipped electronic computing devices. User computing systems may include an operating system and a browser or similar application software configured to properly process and display information, documents, software, applications, applets and scripts provided by the web application server. Although a fixed number of user computing devices are shown for illustrative purposes, any number of user computers may be used in accordance with the disclosure.

The disclosure is not limited to any particular network connectivity or communication protocol. Various forms of communication networks may be used by the user computers to access the web application server. By way of example and not limitation, a proprietary Wide Area Network (WAN) or a public WAN, such as the Internet, may be used. These networks typically employ various protocols such as the Hyper-Text Transfer Protocol (HTTP), File Transfer Protocol (FTP), Extensible Markup Language (XML), and Transfer Control Protocol/Internet Protocol (TCP/IP) to facilitate communication of information between communicatively coupled computers/mobile phones, etc.

A non-limiting exemplary system according to the present disclosure may also utilize wireless networks, including those utilizing Global System for Mobile (GSM), Code Division Multiple Access (CDMA) or Time Division Multiple Access technology, and the Wireless Application Protocol (WAP). Furthermore, a system according to the disclosure may utilize any, all, and any combination of such communications networks, as well as communications networks hereafter developed.

The computing electronic devices 100 described herein (e.g., personal computers, handheld computers (e.g., PDAs) and servers) may be comprised of commercially available computers, hardware and operating systems. The aforementioned computing devices are intended to represent a broad category of computer systems capable of functioning in accordance with the present disclosure. Of course, the electronic devices 100 may include various components, peripherals and software applications provided they are compatible and capable of performing functions in accordance with the present disclosure. The electronic devices 100 may also include information, documents, data and files needed to provide functionality and enable performance of methodologies in accordance with an exemplary embodiment of the disclosure.

Figure 2:
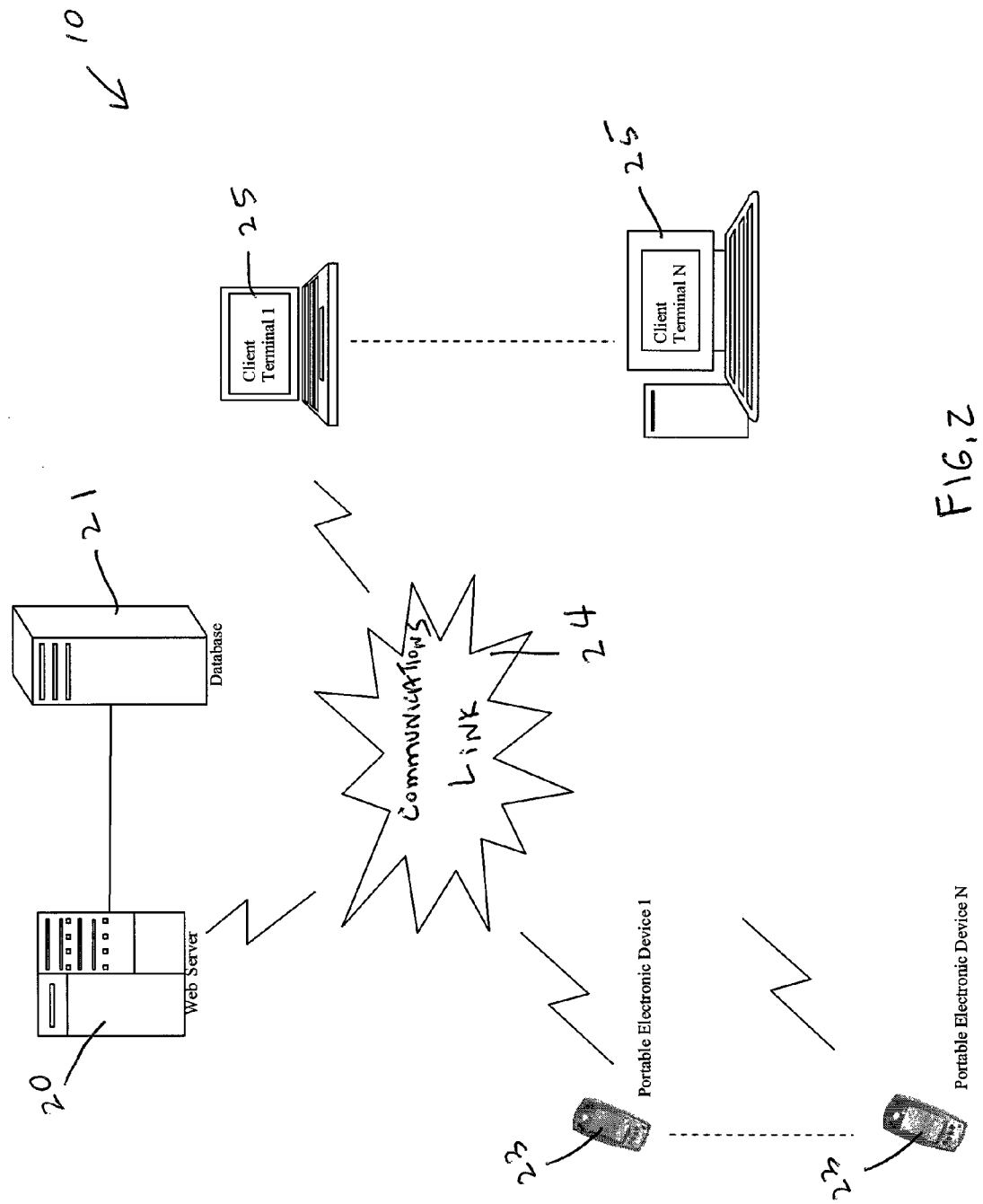
FIG. 2 is a high-level block diagram showing the interrelationship between certain major electronic components, in accordance with the non-limiting exemplary embodiment(s)

Referring to FIG. 2, a firewall may be located between web server 20 and the database 21 to protect against corruption, loss, or misuse of data. The firewall limits access by the web server 20 and prevents corruption of user-generated data. Thus, the web server 20 may be configured to update and receive data only to the extent necessary. The firewall may be comprised of any hardware and/or software suitably configured to provide limited or restricted access to the database 21. The firewall may be integrated within the database 21 or another system component, or may reside as a standalone component.

Functions and process steps described herein may be performed using programmed computer devices and related hardware, peripherals, equipment and networks. When programmed, the computing devices are configured to perform functions and carry out steps in accordance with principles of the disclosure. Such programming may comprise operating systems, software applications, software modules, scripts, files, data, digital signal processors (DSP), application-specific integrated circuit (ASIC), discrete gate logic, or other hardware, firmware, or any conventional programmable software, collectively referred to herein as a module.

In an exemplary embodiment, a communications device preferably facilitates digital communications between system components, such as web server 20 and mobile phone 23. The communications device may include, but is not limited to, Ethernet 100baseT, RS232, USB, and other serial communications modules. Optionally, the device could be implemented as a wireless communications component operating according to a wireless communication protocol, such as 802.11 or IRDA.

In addition, wireless communication according to one implementation of the present disclosure may comprise radio frequency (RF), optical and/or acoustic communication equipment, satellite networks, employing any well-known wireless communication media, techniques and protocols now known in the art or later available.

In accordance with an exemplary networked computer system according to principles of the disclosure, the database 21 hosts a database management system for managing a transaction database, including steps of writing and reading data to and from the database 23. The database 21 may be communicatively coupled to the web server 20, and may reside on the web server 20 or on a separate computer and/or one or more separate database storage devices.

In a non-limiting exemplary embodiment, the system 10 may provide a web-site and mobile phone software application wherein a user logs in and the page is custom tailored to their preferences. There can be a variety of databases to choose from by genre, age, level of difficulty, category—i.e. sports, TV, specific shows, geography, etc. The user may define the content that will be accessed by the link that will then be provided or the telephone number that will be provided. E-mail or text may be sent or phone number is provided for user to access the questions. The user may also simply "play" on the computer or device that they have logged on to. When this link is clicked or when the number is dialed, the user is connected to the service. The user may enter a PIN or the system may simply recognize them based on the device from which they access the site/service.

An interactive attendant may be provided wherein the attendant asks questions and the user verbalizes the answers. Alternatively, the user may press a button on his phone, keyboard or other device to answer the question. The user may also tap, highlight or select the answer on a touch pad device. Answers are then recorded by the system and may be repeated back to the user, stored for future retrieval or sent to another device. If an answer is not given, the attendant will prompt the user to do so. Failure to respond may result in an alarm or vibration of the device itself or a nearby device or other means of alerting the user.

The computer software application may be customizable. As a non-limiting example, a teacher may create a game to send to her students as an assignment wherein the student answers are reported back to the teacher for review. As another example, the employer may create a trivia challenge or test for its employees and/or a parent may create a game for each of their children. The system 10 may also be used for contests. For example, a radio station may send out a quiz via email blast to its listeners and the first listener to submit the correct answer/s may win a prize.

Additional functionality of the computer software application may include initiating an interactive automated voice service. A pause feature may be provided for giving the user time to answer. This feature may be set in advance or the system may ask "Do you need more time? If yes, say yes or press 1. Then when ready, press 2 or say resume." Of course, the dialogue between the player and the game host may be translated into many languages, in a manner well known by one skilled in the art. At a certain time interval which may or may not be user defined, the system may prompt the user again to answer the question. If the user does not answer the question, an alert may sound or a device may vibrate or otherwise alert the user.

Data provided by automated voice attendant is user driven and customizable. The information delivered to a user may be defined by an authorized user. The results of a quiz or test may be automatically transmitted to another user via the web server. Each user may define a level of difficulty and type of questions asked by category. This may be a subscription based service with new questions and versions of content under the same content area. For example, there may be World Geography Intermediate 1, 2 and 3—as more content gets loaded into the system, new versions may be rolled out.

Such an embodiment may be multi-user capable, giving many users the opportunity to create their own "game" and compete against each other.

In a non-limiting exemplary embodiment, if a family or other group wants to play a game together, the computer software program may stratify the questions by user, giving user 1 (an 8 year old) appropriate questions within the content area selected and user 2 the appropriate questions for their age group. This protocol may ensure the same questions are not delivered to the same user or same device. The questions may be customizable by database, by user, by content area, etc.

In a non-limiting exemplary embodiment, there may be a "Driver" or hands-free mode of play and a non-hands free mode. The user may set pause intervals based on the skill level of the user. Once a user is an authorized user of the service, this system may enable the authorized user to create his/her own list of questions to be shared with friends, family, whomever. In essence, each user may create his/her personal database of preselected trivia questions. Such trivia questions may be purchased from a central repository or uploaded from the user's electronic device (such as his/her smart phone). This will help parents and teachers set up quizzes and study guides. It will help employers ensure their employees are up to date and compliant as well as enable publishers to submit or create study guides that will be made available to users.

Exemplary embodiment(s) may also automatically send coupons or discounts based on demographics and current location of the user. Such coupons may generate advertising dollars for the trivia game. As an example, a company may provide a coupon if one of the users completes a survey for the company. A hotel or another company may provide a coupon for their goods/services if the company knows a user is local and needs a place to stay. Of course, various scenarios may be applicable to the function of generating coupons per each user.

Figure 4:
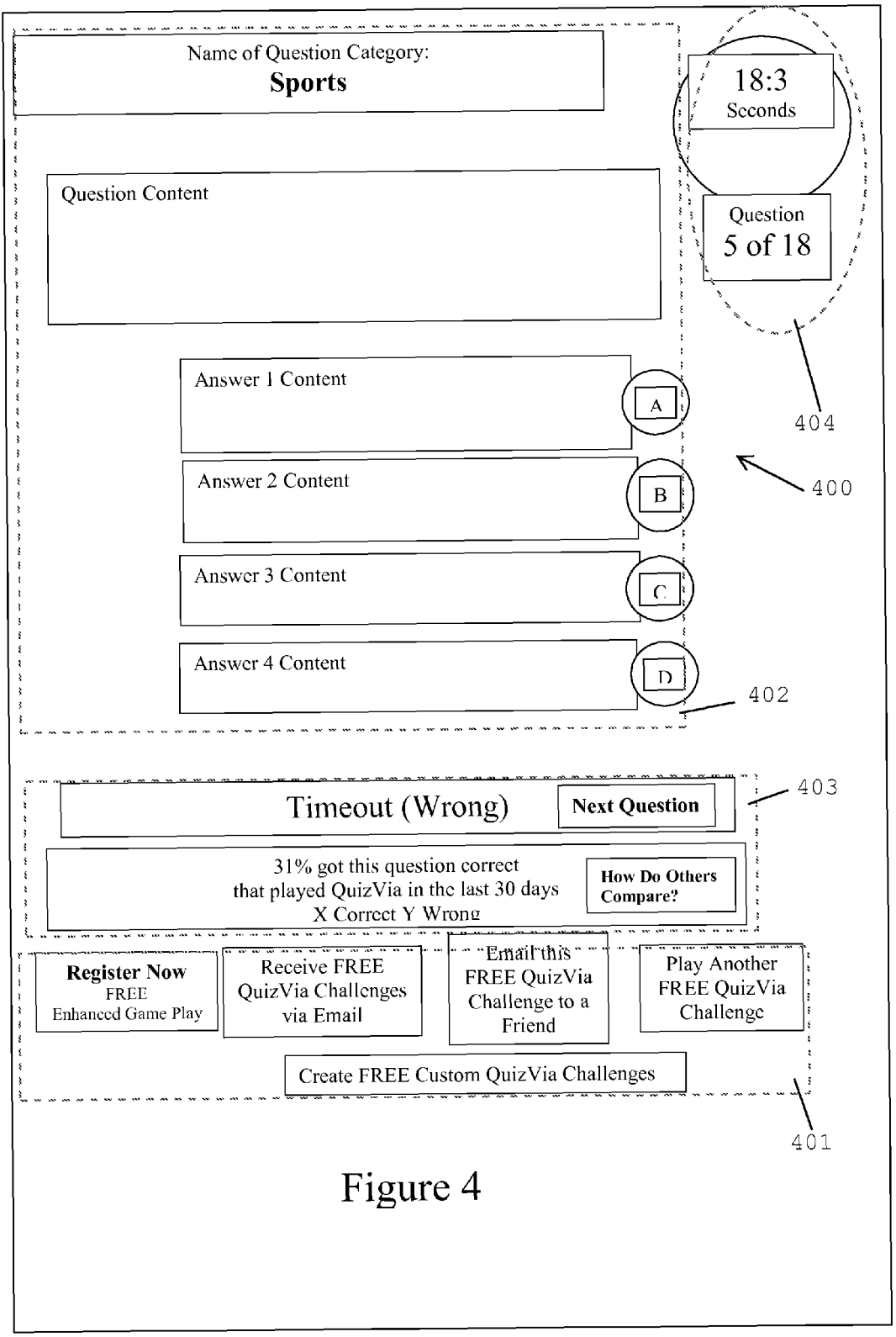
FIG. 4 is flow chart showing an exemplary trivia game play process, in accordance with the non-limiting exemplary embodiment(s)

Referring to FIG. 4, an exemplary graphical user interface (GUI) 400 displayed on a screen of an application executing on computing device 100 is shown. In an embodiment, shown in environment 401, if the player is not a registered user, then upon clicking the GUI, a popup box may appear. For example, a message may appear for notifying the user that he/she must be registered to perform the action. An administrator can edit the message content, as desired. A sample messages may notify the user that registration is free and enhances game play. If the user is registered, the sample message will not appear. Another message may invite the user to receive free trivia game challenges via email and/or ask the user if he/she wishes to email the free game version to a friend. Another message may invite the user to play a free trivia game by clicking an icon displayed on the GUI. Upon clicking such an icon, an administrator-editable quiz about the benefits of registering is initially displayed. Then, a new trivia game starts. Another message may invite the user to create his/her personalized free custom trivia questions.

In an embodiment, shown in environment 402, the name of an exemplary trivia category is displayed at the top of the GUI. Each trivia question may be displayed below the category name. A timer may be displayed on the GUI as well as a game progress box identifying the present question (e.g., question 5 of 18). To answer, a user clicks a designated field on the GUI (e.g., circles A-D, etc.). When a user correctly answers the trivia question or when the GUI shows the correct answer, such designated field displays a green "check" and a font for the answer changes to a predefined category (e.g., shape, size, style, color, etc.). When a user incorrectly answers the trivia question, the designated field displays a red "X". If the answer is true\false or yes\no, then only two designated fields are shown. Such fields appear only if they have content (e.g., answer options). In an embodiment, the answer status box may contain predefined content (e.g., awaiting your answer, correct!, wrong, timeout, etc.). Such predefined content may be displayed in a unique format, color, style, size, etc.

In an embodiment, when a last question has been answered, an additional box may popup on the GUI. For example, the user's score may be displayed. Otherwise, a next question may be displayed. After answering questions, shown in environment 403, statistical data about the question may be provided via the GUI (e.g., 31% got this question correct in the last 30 days or X-Correct/Y-Wrong, etc.). Such statistical and ranking info can be turned off by the user, administrator, game owner, etc. A user may be prompted to inquire about the trivia questions statistics.

Throughout the present disclosure, various terms may be employed. For example: prospect—a player that is not registered with the website; has limited game play and limited customization and receives advertisement to register; client—a player that is registered with the website but does not have a paid subscription; premium—a player that is registered with the website and pays a fee to not see advertisement or have game time outs. A user may be a prospect, client or premium. Other terms include: website system; website administrator (authorized to make changes to the trivia games; game owner (created the specific trivia game and can edit as well as control who can play the trivia game); question owner (created the specific trivia questions and associated answers); game play—a series of question(s) typically between 1-50 total questions that are sequentially asked until completed; game play series—one or more groups of game play(s).

In an embodiment, trivia games enabled via a website may be played for fee. During the game or at the end of the game, the user can click buttons (e.g., hyperlinked icons displayed on the GUI), which launch a new web browser page. If the user wishes to play another trivia game, such a new trivia game can be launched in the same web browser.

In an embodiment, shown in section 404, a countdown timer may be visible to the user during the game play. It can be reset to 20 seconds when a new question is presented to the user and then initiates a countdown to zero. The timer may show the seconds in 1/10 increments via a digital format. The user can have 20 seconds, or other predetermined time period, to answer the trivia question. When the user selects the answer (e.g., clicks an appropriate field), the timer will stop and show the remaining time. An exemplary GUI screen may display a ten question trivia game, one question at a time and the possible answers for it—a predetermined number of answer fields displayed on the GUI screen. The number of displayed answer fields depends on the number of possible answers for each question—created by the question author (i.e., game owner). As an example, a question having two answer choices of True/False would show only two answer fields. The GUI screen may also show "Question 1 of 10" in a designated field. A total number of questions asked in each game can be a default number set by an administrator and/or a registered user.

In an embodiment, shown in section 403, if a user runs out of time to answer a question, the question is treated as a wrong answer. Flow then resumes to displaying the questions statistics and the next question. If a user clicks the browser's back/forward buttons, a popup message notifies the user of an error (e.g., "During Game Play you may not use the browser's back/forward buttons. Please choose an answer".)

In an embodiment, if a user runs out of time to answer a question, the question is treated as a wrong answer. Flow then resumes to displaying the questions statistics and the next question. If a user clicks the browser's back/forward buttons, a popup message notifies the user of an error (e.g., "During Game Play you may not use the browser's back/forward buttons. Please choose an answer".)

In an embodiment, pages displaying the game may use SSL and may not require a user login to be SSL. Old pages may expire when a new question page is presented after an appropriate field (e.g., "Next Question").

In an embodiment, if a user launches a trivia game from another computer or mobile device, other users are prevented from launching the same trivia game from another computing or mobile device during game play. Thus, trivia questions cannot be repeated on separate devices during game play.

In an embodiment, the user may be permitted forward (continue) an active trivia game between two or more devices (i.e., laptop and mobile phone).

In an embodiment, a minimum of two but not more than four possible answers may be simultaneously displayed on the GUI screen. The user may select only one answer. Answers cannot be modified after user selection.

In an embodiment, previously answered questions are not displayed for the same user, including unregistered users who have previously played the trivia game. For example, questions may be tracked to monitor each user's exposure to such questions. Questions may be displayed if the user has never answered the question and/or if the user has never correctly answered the question. Question may be randomly displayed in random order. Answers may also be displayed in random order. Questions may be displayed based upon a predefined algorithm selected by a developer of the trivia game.

In an embodiment, a question author may add a new question to the trivia game by activating an associated object on the GUI screen. Such an object may be accessed via a public/private page. However, the question author must by a registered user. If the question author is not logged in, the user is directed to another screen to register an account. Creating a new account requires the user to activate an account through an email link that will be sent to user upon completing his/her profile.

In an embodiment, email content is editable by the administrator and my employ macros for mail merge functionality. Clicking on the email link activates the account and automatically logs-in the new user. As this point, the logged-in user is taken to a question category page that is managed by a SMI. The SMI instructs the user to perform a series of tasks in a sequential order. As an example, the user must first accept a question release disclaimer, which may be edited by the administrator. Such a disclaimer may be similar to a shrink wrap agreement with an "accept box" displayed at the end of the disclaimer. Release must be accepted by the user each time a new session is initiated for adding a question. As an option a separate end user agreement page may be displayed and accessed via a separate URL.

In an embodiment, a category page will then display all trivia question categories. Several columns may be displayed wherein the categories are sorted A-Z, print left-to-right and top-to-bottom across the columns. If needed, the category page may automatically provide vertical scroll bars. All fillable fields may be viewable by the user without scrolling left-to-right. That is, the user must select one and only one subject category for the current question. On the category page, the user may select a "Multiple Choice" or "True\False" category. On selection, the proper number of fields appears and the SMI validates that all tasks have been completed before moving onto the next steps. That is, SMI will not accept the submission until validation is "True".

In an embodiment, next, a question page appears and user types the new question. While typing the new question, the SMI performs an "AND" query matching process on all words typed by the user. The query selects only those questions in the same category that the user selected for the current question. The query matching process is not case sensitive. The query looks for only whole word matches—not connective words— (e.g., the, of, a, and, is, or, to, etc.) The query match for a given word is true on the first occurrence of any given word in a question string. SMI displays all potentially matching trivia questions in real-time. Thus, as the user types, the list of question matches shorten—similar to a GOOGLE® searching protocols.

In an embodiment, the user may click an object, on the GUI screen, next to one of the answers to designate the correct answer. The question is then identified as either public/private. A public question may be used by any user in any trivia game. Such public questions may have a predetermined font/style/color, etc. Private questions are not approved by the SMI and may be used by only friends of the user. Thus, only the question author grants user-permission for such private questions. Third party forwarding is disabled for private questions and each private question may have a predetermined font/style/color, etc.

In an embodiment, when the user has submitted the question, SMI will validate whether all steps have been properly completed. Upon validation, SMI prompts the user to create another question or redirect to the user's home page. An email may be sent to the question author to confirm validation of the new question. Also, selected users and user class(es) may be notified of the pending new question. After the new question is approved, the question author is notified of same. A complete list of previous questions may be displayed via a link or by logging into the user's account. The user may also see if other players have answered the user's questions. If the new question is not approved by the automated process, a question evaluator is requested to review the content and take appropriate action.

During evaluation, the question is tagged with the: date of creation, identity of user who created the question, the question release content, and question type (public/private). A public user created question, as opposed to system created question, will have a predetermined set of font/style/color, etc., which are editable by the administrator. The question author's age may also be placed in a queue for review. Questions will not be available for use until an evaluator or SMI validates the question. If a new question is no longer categorized as a public question, the question will be treated as a system-generated question. For simplicity, public/private/system questions may be visually displayed via unique font/style/color, etc.

In an embodiment, a registered user may be permitted to edit his/her public question. However, the administrator must approve such edits prior to becoming available for game play. Related documents within the database may be used to collect contact information to create a registered user account and set basic sharing preferences for sharing statistics and personal information. Such related documents may also link data to find registered friends; accept/create/reject friend invites; create/edit play groups, etc. For example, a table within the database may be used to associated players that have received a "play" request and whether the request was accept/ignored/ignored, etc.

In an embodiment, a registered user is permitted to create trivia game templates, invite friends to play and immediately start game play as well as save the game to play later. Users who abuse such templates are monitored and can be blocked by the administrator. The administrator also monitors "high" or frequent user data such as: the number of new questions added; the number of friends; the number of people that play their questions; and the number of people that play their games. "High" or frequent questions may also be monitored such as: the number of times they are played in total; and the frequency they were played over a given date time period.

In an embodiment, security actors may act as users to monitor both registered and not registered prospects.

The system, method and computer program product of the present disclosure may be enabled on one or more of the following environments: mobile device; slates, laptops, desktops, etc. Hands-free user interaction may be employed for controlling game play without the need to use a keyboard/mouse. Dedicated applications may be downloaded onto a mobile device running various operating systems (i.e., iOS, Andriod, Blackberry, Windows mobile, etc.). Vibration and sound output may be adjusted by the user. Predefined voice commands may be provided (e.g., "Pause", "Start", "New Game", "Repeat Question", etc.). Software keyboards may also be provided.

In an embodiment, a user may control the type of content delivered to them as well as the type of content provided to others. Automated hyperlinks may be sent to mobile devices and website accounts to accept game play from another user and/or user class.

Figure 5:
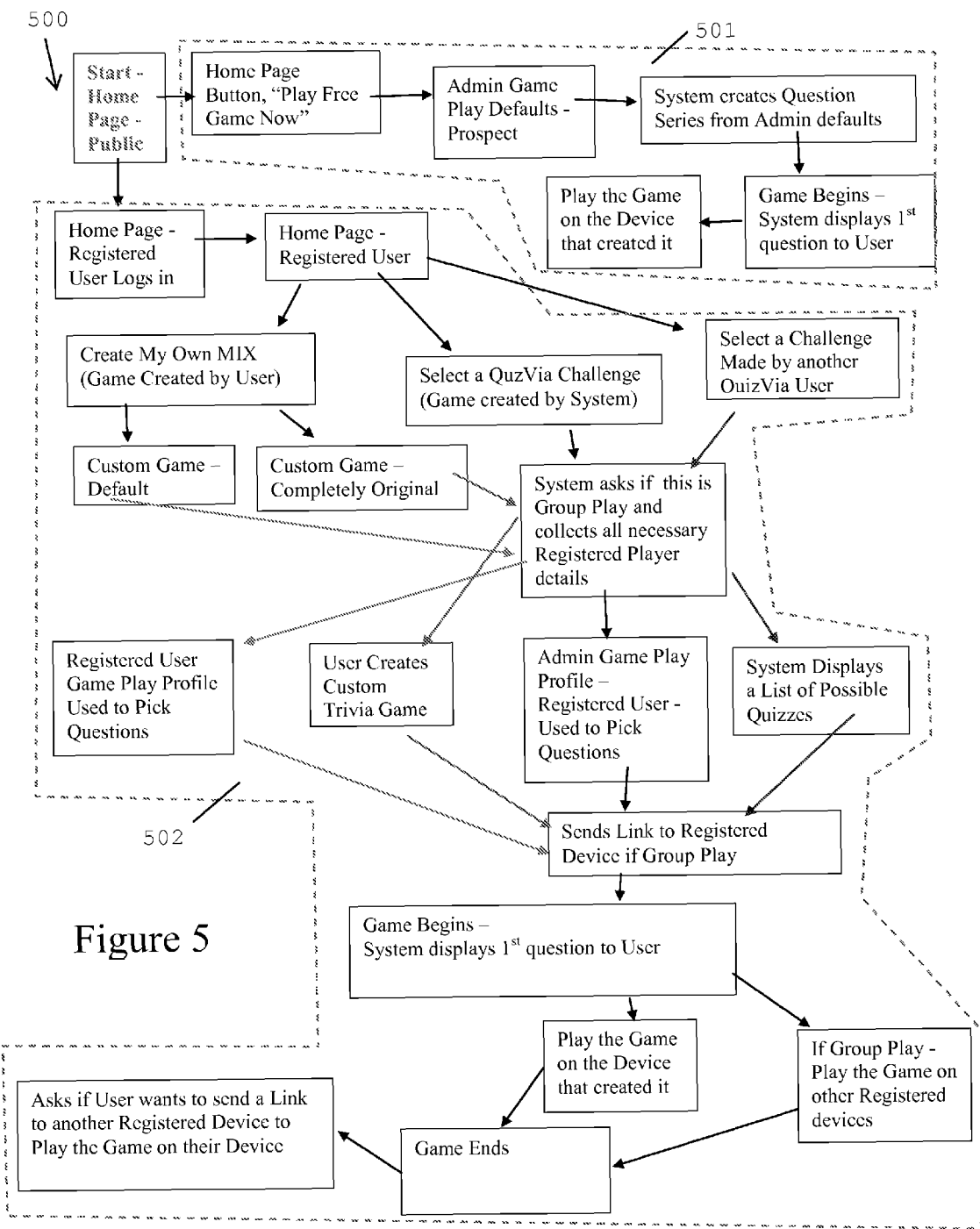
FIG. 5 is flow chart showing an exemplary trivia game play process, in accordance with the non-limiting exemplary embodiment(s).

In an embodiment, as perhaps best shown in FIG. 5, an exemplary process 500 for performing the functions of the present disclosure may include the following, shown in environment 501: a non-registered user accessing a home page, selecting a game play object displayed on a GUI screen of an application executing on the home page, designating a type of user, selecting game play default rules, automatically creating questions from default settings, and playing the game. Flow may continue to the following steps: displaying first question to the user, answering the question.

In an embodiment, shown in environment 502, a registered user logs into the website, selects a trivia game challenge from another registered user or from the website or by the registered user's own creation. User information is then collected by asking whether a single user is playing the game or whether a group is playing the game. A game owner can specify which registered users can play the game. Game forwarding may be disabled to prevent other users from inviting/forwarding the game to other users. Now, the trivia game can be created by evaluating the registered users' profiles. Trivia questions can be selected based upon the credentials of each registered user playing the game. For example, the system may suggest questions or the game owner may select questions. Game links may be submitted to each registered player. Upon activation, by each player, the first question is displayed and the trivia game begins. After the game is finished, if authorized by the game owner, each registered user is asked whether he/she would like to send a hyperlink to another registered user for playing the game.

While the non-limiting exemplary embodiment(s) has been described with respect to a certain specific embodiment(s), it will be appreciated that many modifications and changes may be made by those skilled in the art without departing from the spirit of the non-limiting exemplary embodiment(s). It is intended, therefore, by the appended claims to cover all such modifications and changes as fall within the true spirit and scope of the non-limiting exemplary embodiment(s). In particular, with respect to the above description, it is to be realized that the optimum dimensional relationships for the parts of the non-limiting exemplary embodiment(s) may include variations in size, materials, shape, form, function and manner of operation.

What is claimed as new and what is desired to secure by Letter Patent of the United States is:

1. A method for facilitating an interactive game, the method executing on at least one processor of a computing device, comprising the steps of:
    detecting a first user input from a first user at a graphical user interface (GUI) displayed on a screen of an application executing on the computing device;
    upon detecting said first user input from said first user, displaying a game play object at the GUI, said game play object identifying an initial game to be played by said first user;
    detecting, at the GUI, a second user input from said first user, wherein said second user input selects a game question category associated with said initial game;
    upon detecting said second user input at the GUI, determining whether said first user is a game owner of said initial game;
    if said first user is said game owner, selecting game play default rules that designate a plurality of initial game questions associated with said game question category, said initial game questions comprising at least one automatically created initial game question, at least one predetermined initial game question, and at least one user-created initial game question;
    upon selection of said game play default rules, said game play default rules automatically creating said at least one automatically created initial game question;
    prior to said first user initiating said initial game, said first user selecting said at least one predetermined initial game question from a set of one or more predetermined questions associated with the game question category;
    enabling first user to create said at least one user-created initial game question, each of said at least one user-created game question having at least one question and at least one associated answer;
    initiating said initial game having said plurality of initial game questions including said at least one automatically created initial game question, said at least one predetermined initial game question from the set of one or more predetermined question associated with the game question category, and said at least one user-created initial game question;
    receiving a third user input from said first user that invites a second user to play said initial game through a hyperlink;
    enabling said second user to forward said hyperlink of said initial game to a third user during play of the initial game;
    upon approval from said first user, said game play default rules enabling creation of a subsequent game comprising a plurality of subsequent game questions to be added to the plurality of initial game questions, said subsequent game questions comprising said at least one additional automatically created initial game question and at least one subsequent user-created game question;
    prior to initiating play of said subsequent game, said game play default rules further enabling at least one of said second user and said third user to create said at least one subsequent user-created game question; and
    enabling said second user or said third user to initiate said subsequent game.

2. The method of claim 1, further comprising the step of:
    if the game play default rules consider credentials of the second user, creating said at least one subsequent user-created game question based on the credentials of said second user.

* * * * *